May 5, 1970     D. H. LONG, JR     3,509,975
CLUTCH AND TRANSMISSION ASSEMBLY
Filed May 31, 1968     3 Sheets-Sheet 2
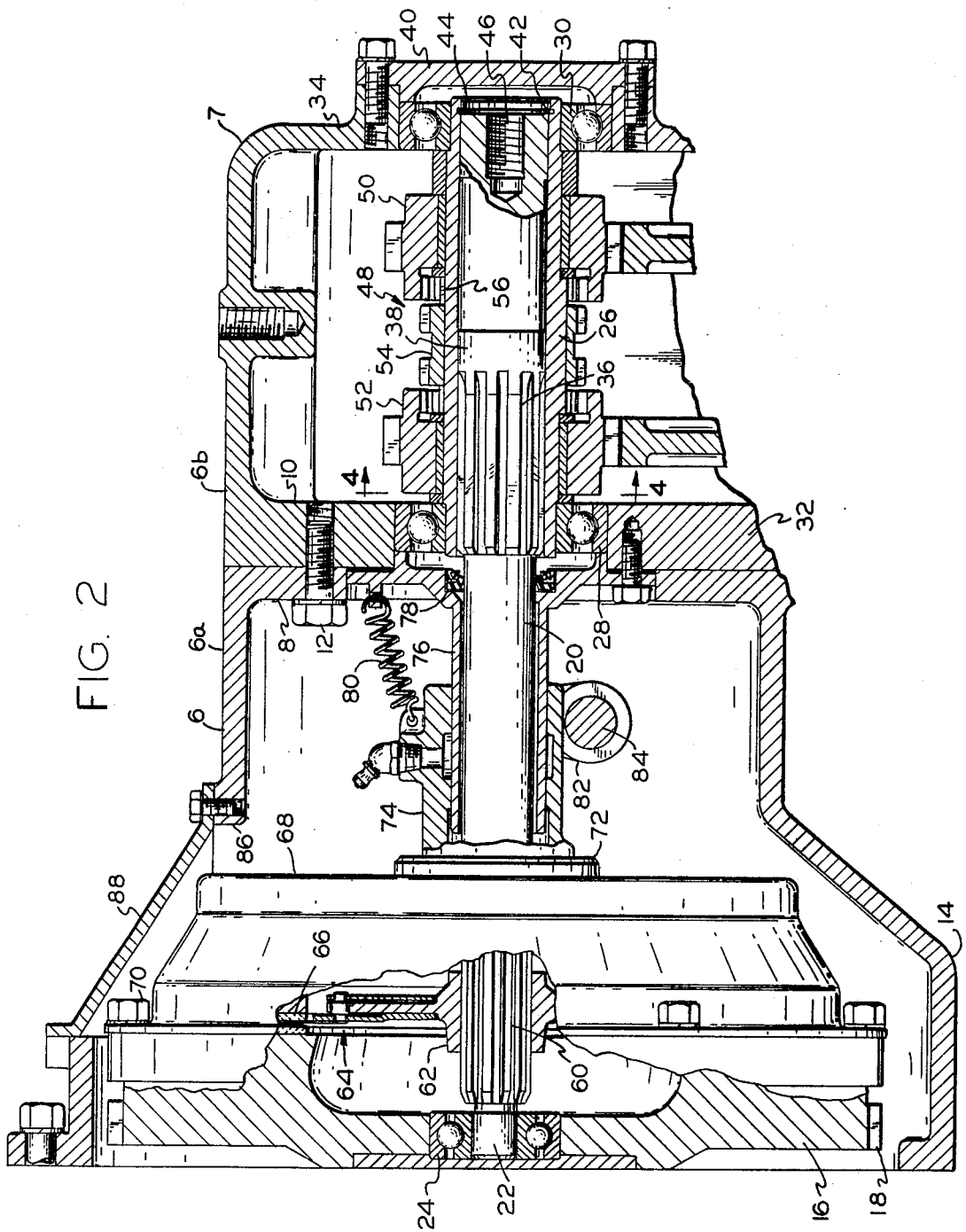
DEWEY H. LONG, JR.
INVENTOR
BY Eugene M. Eckelman
ATTORNEY May 5, 1970   D. H. LONG, JR   3,509,975
CLUTCH AND TRANSMISSION ASSEMBLY
Filed May 31, 1968   3 Sheets-Sheet 1

DEWEY H. LONG, JR.
INVENTOR
BY Eugene M. Eckelman
ATTORNEY

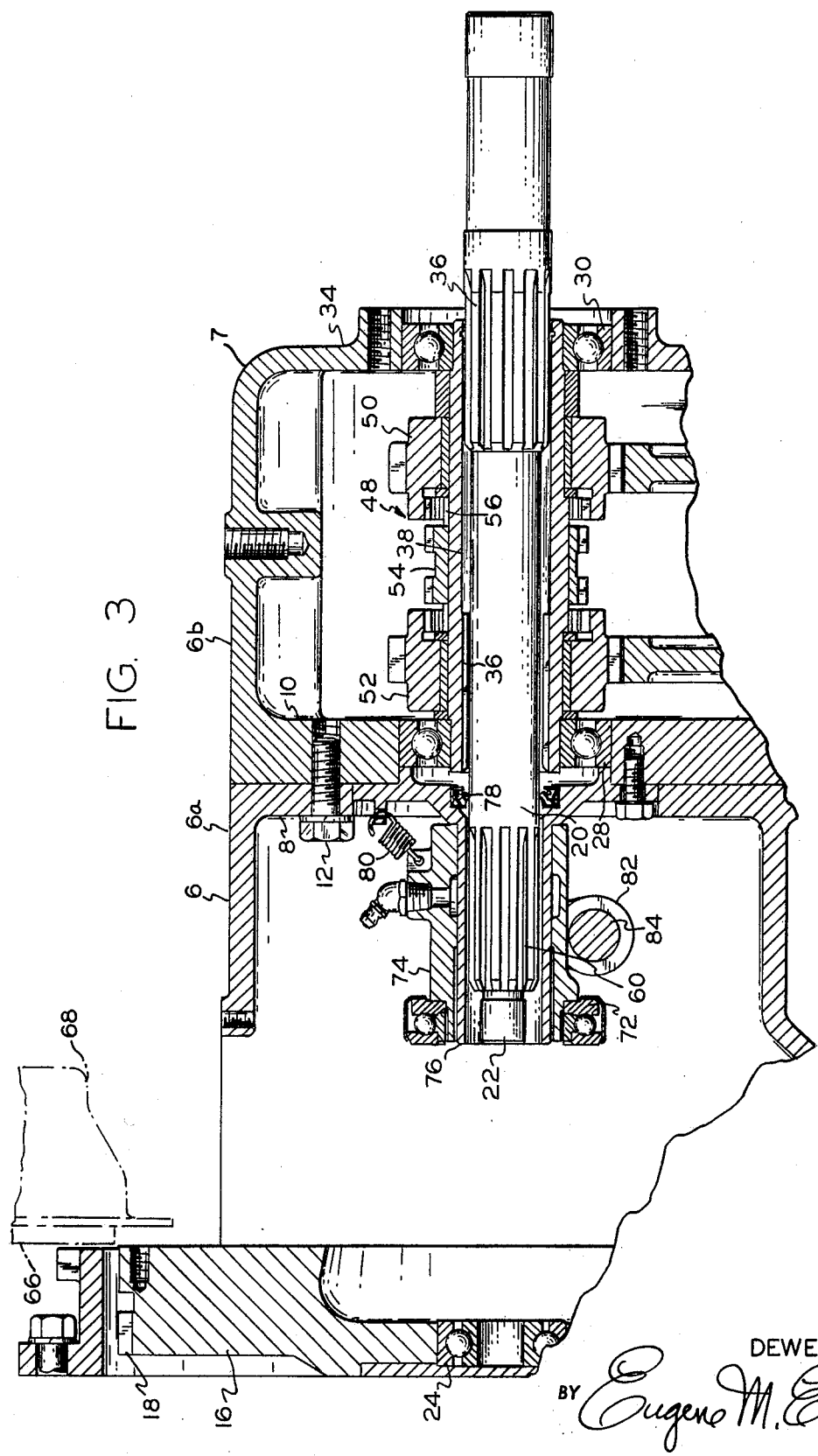

3,509,975
CLUTCH AND TRANSMISSION ASSEMBLY
Dewey H. Long, Jr., Milwaukie, Oreg., assignor to Pettibone Mercury Corporation, Tualatin, Oreg., a corporation of Oregon
Filed May 31, 1968, Ser. No. 733,646
Int. Cl. F16d 67/00
U.S. Cl. 192—110                                 1 Claim

ABSTRACT OF THE DISCLOSURE

A clutch housing for a vehicle has a shaft therein supporting a clutch driven plate assembly. One end of the shaft has journaled connection with a flywheel of the vehicle and a hub of the driven plate assembly has a splined connection with the shaft adjacent to the end at the flywheel. The other end of the shaft is received within a drive tube and has a splined connection therewith for unitary rotation. The drive tube has rotatable support in the housing and has outer connecting means for driving output mechanism. The shaft is adjustable axially within the tube so as to be retracted from clutch mechanism to permit the latter to be removed radially from an access opening in the housing for repair.

BACKGROUND OF THE INVENTION

This invention relates to a new and novel clutch assembly and particularly to a clutch assembly ararnged for rapid change of clutch plates.

It is a well known fact that lift truck operators severely abuse the drive mechanism of the lift truck since instead of applying the brakes in many instances they merely shift the transmission into the opposite gear while still moving and then skillfully manipulate the clutch and accelerator to accomplish the braking effect. By such mode of operation, they are in the opposite gear when the vehicle stops and considerable time which would be taken up by shifting and clutching after the vehicle is stopped by the brakes is saved. In some cases where the lift truck has very use new clutch driven plates must be installed as often as once a week.

The installation of new clutch driven plates in lift trucks of present usage comprises a time consuming and expensive operation since the clutch assembly is usually associated directly with transmission mechanism and it is necessary to disassemble a portion of the transmission to repair the clutch. For this purpose, split-type housings for the transmissions have been provided but even such transmissions the clutch changing operation consumes considerable time and requires the service of a skilled mechanic since the transmission must be partially disassembled to accomplish clutch removal and assembly. Partial disassembly of the transmission also takes considerable time and in addition to using the mechanic's time it may take up valuable operating time for the lift truck.

SUMMARY OF THE INVENTION

The present invention has as its important objective to provide a rapid change clutch assembly which is a valuable improvement over prior devices in that the means for removing necessary clutch parts is more simplified and requires no appreciable disassembly of the clutch housing or a housing associated with the clutch which encloses output mechanism.

More particular objects of the invention are to provide in combination a shaft which detachably supports a clutch driven plate assembly, and means for supporting the shaft in axially adjustable relation so that said shaft can be retracted from the detachable driven plate assembly an amount wherein one end of the shaft clears the assembly to permit the latter to be removed radially from the housing through an access opening; to provide such a shaft in combination with a supporting or drive tube connected to the shaft for unitary rotation and supporting it for its axial adjustment; to provide said tube with exterior driving means for connection to output mechanism; to provide an axially removable journaled connection of the shaft with a flywheel of the vehicle to provide the axial retracting movement of the shaft from the clutch assembly; to provide slidable support means for a throw-out bearing carrier whereby the said carrier is capable of being retracted from other parts of the clutch assembly in order that the latter can be removed from the housing; and to provide means on the shaft for connection to pulling tool means for retracting the shaft.

The invention will be better understood and additional objects and advantages will become apparent from the following description which illustrates a preferred form of the device.

BRIEF DESCRIPTION OF THE DRAWINGS

FIG. 2 is a longitudinal vertical sectional view through the clutch and transmission housing, this view being turned end for end with relation to FIG. 1. FIG. 2 shows the shaft in the housing in an operative drive position with the clutch assembly;

FIG. 3 is a vertical sectional view similar to FIG. 2 but showing the shaft retracted and the clutch assembly in the process of being removed.

DETAILED DESCRIPTION OF A PREFERRED EMBODIMENT

Figure 1:
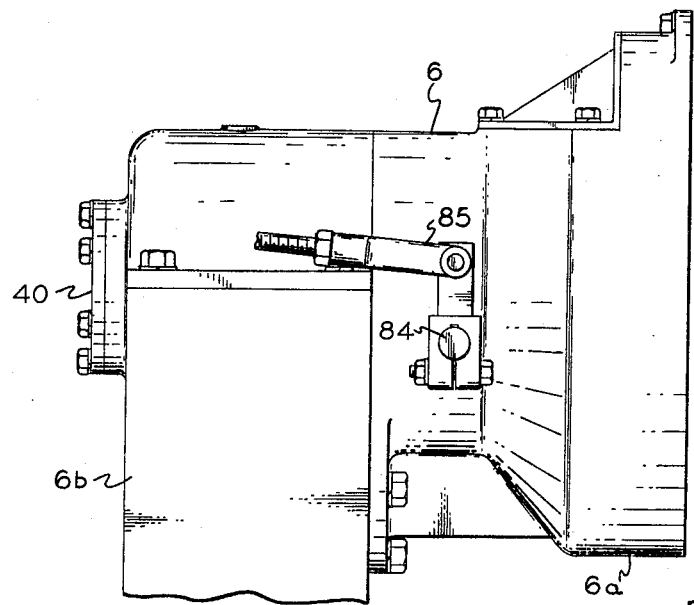
FIG. 1 is a fragmentary side elevational view of a clutch and transmission housing.

Referring to the drawings and particularly to FIGS. 1, 2 and 3, a housing 6 is provided which may comprise a clutch housing portion 6a and a gear or transmission housing portion 6b having a top removable head 7. These two housing portions have inturned walls 8 and 10, respectively, secured together by suitable means such as by cap screws 12. Clutch housing portion 6a has an enlarged end portion 14 in which is contained a flywheel 16 having gear teeth 18 engageable by a conventional starter drive pinion not shown.

A shaft 20 extends longitudinally and centrally of the housing 6 and has journaled removable connection at the clutch end by engagement of a reduced end portion 22 thereof in a bearing 24 supported in the flywheel 16.

Figure 4:
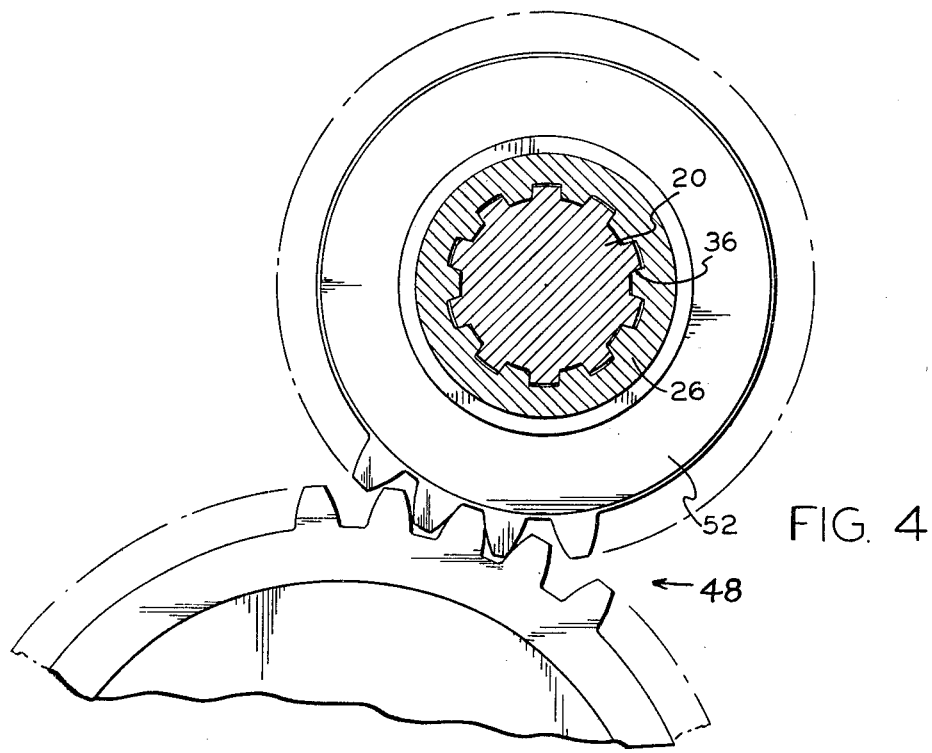
FIG. 4 is a fragmentary cross sectional view taken on the line 4—4 of FIG. 2.

The other end of shaft 20 has support in a drive tube 26 journaled in the housing 6b by a pair of bearings 28 and 30, the bearing 28 having support in inturned wall portion 10 of housing 6b and the bearing 30 having support in an end wall 34 of said housing. The inner or forward end portion of tube 26 and an intermediate portion of shaft 20 have interengaging spline means 36, also seen in FIG. 4, to provide unitary rotation of the tube and shaft. The interior surface 38 of the tube 26 rearward of the spline grooves is of a diameter slightly greater than the outer diameter of the splined portion of the shaft whereby as seen in FIG. 3 the shaft can be retracted rearwardly in the tube. The rearward end of housing portion 6b has an end cap 40 which can be removed when the shaft is to be retracted, as will be explained in greater detail hereinafter. The shaft is maintained in its forward FIG. 2 position by a snap ring 42 engageable in a snap ring groove 44 provided interiorly of the tube 26 adjacent the rearward end thereof. The rearward end surface of shaft 20 has a threaded bore 46, FIG. 2, for engagement with a pulling tool, not shown, operative to move the shaft to its retracted position.

Drive tube 26 has a drive connection with output mechanism designated generally by the numeral 48. Such output mechanism may comprise transmission forward and reverse gears 50 and 52, respectively, slidable on the tube 26 and engageable with a dental clutch gear 54 having a splined connection 56 with the exterior surface of the tube. All of the details of the gear transmission associated with tube 26 are not shown or described since such mechanism is well known in the art. Although in the usual case the tube 26 will drive output mechanism in the form of a gear transmission it is to be understood that said tube may drive other types of transmissions such as hydraulic transmissions or even other type mechanisms.

The forward end of shaft 20 has a splined connection 60 with a hub 62 forming a part of a clutch driven plate assembly 64 including clutch plates 66. A cover assembly 68 encloses the driven plate assembly 64 and is detachably secured to the rearward surface of the flywheel by cap screws 70 for rotation therewith.

The clutch assembly is of conventional construction, and is not fully illustrated for purposes of brevity. It has pressure plate means, not shown, normally biased into clutch engaging position and engageable by operating fingers, also not shown, capable of retracting the pressure plate to a clutch disengaging position. Disengaging means for the clutch driven plate assembly 64 comprises a throw-out bearing 72 mounted on a carrier 74 slidable on a forward projecting tubular extension 76 which is of suitable interior diameter to slidably receive shaft 20. Tubular extension 76 comprises an integrated part of housing portion 6a and includes a seal 78 to prevent oil from entering the clutch housing. Carrier 74 is urged rearwardly by a tension spring 80 and is arranged to be forced forwardly by lever means 82 suitably engageable therewith and secured on a shaft 84. Shaft 84 projects from the housing 6a and is rotated by suitable clutch linkage means 85, FIGURE 1, leading to the clutch pedal in the operator's compartment. Throw-out bearing 72 operates the clutch driven plate assembly 64 by means of pressure plate means and operating fingers, not shown, for disengaging the clutch plates upon disengaging movement of the clutch pedal.

Clutch housing 6a has a top access opening 86 substantially vertically aligned with the clutch cover assembly 68, and this opening is closed by a detachable cover 88. Opening 86 has a sufficient circumferential expanse to permit the cover assembly 68 to be removed from the housing in a radial direction.

OPERATION

In the operating condition of the present mechanism the parts are disposed as shown in FIG. 2 wherein the shaft 20 is in its forward position with the reduced end portion 22 engaged in bearing 24. The clutch assembly normally establishes a drive connection between the flywheel 16 and the shaft 20, and since the shaft 20 has unitary rotation with the drive tube 26 driving power is applied to the output mechanism 48. Selected movement of the carrier 74 to the left as viewed in FIG. 2, causes a disengagement between the flywheel housing and clutch pressure plate.

When clutch plates 66 are worn it is merely necessary to remove the end cap 40 of the transmission housing portion 6b as well as the snap ring 42. A pulling tool, not shown, is then engaged with the tapped bore 46 and the shaft is pulled rearwardly to the position shown in FIG. 3, namely, to a position wherein the forward end thereof is rearward of the cover assembly 68. The carrier 74 retracts to the FIG. 3 position wherein the throwout bearing 72 also clears the cover assembly. Access cover 88 is removed and the cap screws 70 holding the cover assembly 68 on the flywheel are also removed. Since the shaft 20 has been retracted so as to be disengaged from the clutch driven plate hub 62 and to a position clear of the cover assembly 68, said cover assembly and driven plate assembly can be removed radially through the opening 86.

The clutch driven plate assembly 64 and the cover assembly 68 are readily reinstalled by axially aligning them with the shaft 20 and then moving the latter forwardly to accomplish the splined connection between the shaft and hub 62 and the bearing support of reduced end portion in the flywheel. The cover assembly 68 is then secured to the flywheel by cap screws 70. Snap ring 42 is reinserted and the cap 40 and cover plate 88 are reinstalled. By the structure described, the drive tube 26 can also be moved longitudinally by first pulling its bearing 30, whereby the transmission parts 48 can be removed upwardly upon removal of the cap 7.

Thus, the process of changing clutch plates can be accomplished in a very short time since no part of the transmission or clutch housing requires appreciable disassembly. Valuable working time for personnel and for the vehicle will thus be saved.

It is to be understood that the form of my invention herein shown and described is to be taken as a preferred example of the same and that various changes in the shape, size and arrangement of parts may be resorted to without departing from the spirit of my invention or the scope of the subjoined claim.

Having thus described my invention, I claim:
1. A clutch and transmission assembly comprising
   (a) a clutch housing having front and rearward ends and defining side walls,
   (b) a transmission housing having front and rearward ends and defining side walls,
   (c) said transmission having its forward end secured to the rearward end of said clutch housing for disposition in end to end relation with the clutch housing,
   (d) a shaft extending longitudinally through the clutch housing and through the transmission,
   (e) a longitudinally extending drive tube journaled adjacent both its ends in the transmission housing and disposed around a portion of the shaft for supporting the latter,
   (f) means on the rearward end of the transmission housing defining an opening aligned longtudinally with the shaft and drive tube for removal of such shaft and drive tube from the transmission housing,
   (g) removable cover means for said opening,
   (h) splined connecting means between said drive tube and said shaft providing unitary rotation of said tube and shaft and also providing axial adjustment of the shaft in the tube,
   (i) a clutch driven plate assembly supported on a forward portion of said shaft in a connection providing unitary rotation and axial adjustment of said clutch driven plate assembly on said shaft,
   (j) ratio output means in said transmission housing having splined conncetion on said drive tube,

(k) removable cap means on said clutch housing and said transmission housing for removing said clutch driven plate assembly and ratio output means from the respective housings in a radial direction, (l) said shaft in an axial adjustment thereof in said housings being arranged to be retracted rearwardly through said end opening an amount to clear the clutch driven plate assembly for removal of the driven plate assembly through said side opening, and said driven tube in an axial adjustment in said transmission housing being arranged to be retracted rearwardly through said end opening for end removal therefrom of said ratio output means.

References Cited

UNITED STATES PATENTS

| | | |
|---|---|---|
| 1,821,127 | 9/1931 | Vandeveer. |
| 2,398,164 | 4/1946 | Spangler et al. ____ 192—110 R |
| 2,579,191 | 12/1951 | Kludt _____ 192—110 R |
| 2,652,912 | 9/1953 | Bernardo _____ 192—70.13 |
| 2,857,031 | 10/1958 | Fawick _____ 192—110 R |

BENJAMIN W. WYCHE III, Primary Examiner

U.S. Cl. X.R.

192—3.5